(12) United States Patent
Cern

(10) Patent No.: US 7,339,458 B2
(45) Date of Patent: Mar. 4, 2008

(54) POWER LINE COMMUNICATIONS INTERFACE AND SURGE PROTECTOR

(75) Inventor: Yehuda Cern, Brookline, MA (US)

(73) Assignee: Ambient Corporation, Newton, MA (US)

( * ) Notice: Subject to any disclaimer, the term of this patent is extended or adjusted under 35 U.S.C. 154(b) by 181 days.

(21) Appl. No.: 11/133,594

(22) Filed: May 20, 2005

(65) Prior Publication Data

US 2006/0262881 A1    Nov. 23, 2006

(51) Int. Cl.
*G05B 11/01*    (2006.01)

(52) U.S. Cl. .......................... 340/310.16; 340/310.18; 340/538.17; 340/532; 340/538

(58) Field of Classification Search ........... 340/310.01, 340/310.11, 538.11, 538.16, 538.17, 310.16, 340/310.17, 310.18, 532, 538
See application file for complete search history.

(56) References Cited

U.S. PATENT DOCUMENTS

| | | | |
|---|---|---|---|
| 4,616,286 A | 10/1986 | Breece | 361/56 |
| 5,278,771 A | 1/1994 | Nyenya | 700/293 |
| 5,805,053 A | 9/1998 | Patel et al. | 340/310.11 |
| 6,118,639 A * | 9/2000 | Goldstein | 361/55 |
| 6,122,157 A * | 9/2000 | Gerlach | 361/124 |
| 6,690,283 B2 * | 2/2004 | Nemoto et al. | 340/664 |
| 6,844,810 B2 * | 1/2005 | Cern | 375/258 |
| 7,148,799 B2 * | 12/2006 | Cern et al. | 340/538.16 |
| 7,158,041 B2 * | 1/2007 | McDonald et al. | 340/635 |

* cited by examiner

*Primary Examiner*—Toan N. Pham
(74) *Attorney, Agent, or Firm*—Ohlandt, Greeley, Ruggiero & Perle, LLP

(57) ABSTRACT

There is provided a system that includes an AC power input port for connection to an AC power line, an AC power output port for providing power from the AC power line, an AC power surge suppression circuit for limiting voltage at the AC power output port, a data port, a capacitive data coupler for coupling a data signal between the AC power input port and the data port, and a data port surge suppression circuit for limiting voltage at the data port.

16 Claims, 4 Drawing Sheets

POWER LINE COMMUNICATIONS INTERFACE AND SURGE PROTECTOR

BACKGROUND OF THE INVENTION

1. Field of the Invention

The present disclosure relates to power line communications, and more particularly, to system that provides an interface between a power line and a communication device, such as a modem.

2. Description of the Related Art

Power line communications (PLC), also known as Broadband over Power Line (BPL), is a technology that encompasses transmission of data at high frequencies through electric power lines, i.e., conductors used for carrying a power current. Power current is typically transmitted through power lines at a frequency in a range of 50-60 hertz (Hz). In low voltage lines, power current is transmitted with a voltage between about 90 to 600 volts. BPL may also be carried out over medium voltage lines, operating in a range of 1,000 to 35,000 volts. The frequency of the data signals is greater than or equal to about 1 megahertz (MHz), and a voltage of the data signal ranges from a fraction of a volt to a few tens of volts. Data communication can employ various modulation schemes such as amplitude modulation, frequency modulation, pulse modulation or spread spectrum modulation.

A modem, used as part of a PLC network, may receive its electric power from a low voltage power line. Power line terminals on the modem may also be used for the transmission and reception of PLC signals.

A PLC modem may be included in communications node that is installed on an electric pole and powered from overhead lines. Lightning and other transients on such lines may have amplitudes in excess of those found on low voltage power line outlets inside buildings. Therefore, a power input circuit of the node needs to protect node circuitry from high voltage transient surges, e.g. 6,000 volts.

Surge protection components are often shunt components having substantial capacitance that would short circuit high frequency data signals entering or leaving the node on its power line. A power input circuit must simultaneously provide low loss high frequency data signal flow and adequate surge protection for all power ports and data ports.

A further requirement for overhead communications nodes is for remote diagnosis of faults, including loss of input power or fuse opening. The node's power input terminals also serve as sensor terminals for these conditions, and so receive the brunt of surge transients. For communications nodes that have backup battery power, information from a sensor can be transmitted to a central operations facility, from which maintenance personnel may be dispatched.

A node will generally require only a phase and a neutral conductor for node power. However, overhead power lines often have two or three phases, and it is useful to drive all of these phases with PLC signals. Driving all of the phase lines with the same PLC signal may increase electromagnetic emission from these lines. In such cases, it is preferable to drive different phase conductors with PLC signals of mutually opposing phases, so as to obtain some cancellation of emissions.

There is a need for a power line interface circuit for a PLC modem harmoniously integrates the aforementioned requirements.

SUMMARY OF THE INVENTION

There is provided a system that includes an AC power input port for connection to an AC power line, an AC power output port for providing power from the AC power line, an AC power surge suppression circuit for limiting voltage at the AC power output port, a data port, a capacitive data coupler for coupling a data signal between the AC power input port and the data port, and a data port surge suppression circuit for limiting voltage at the data port.

DESCRIPTION OF THE INVENTION

Figure 1:
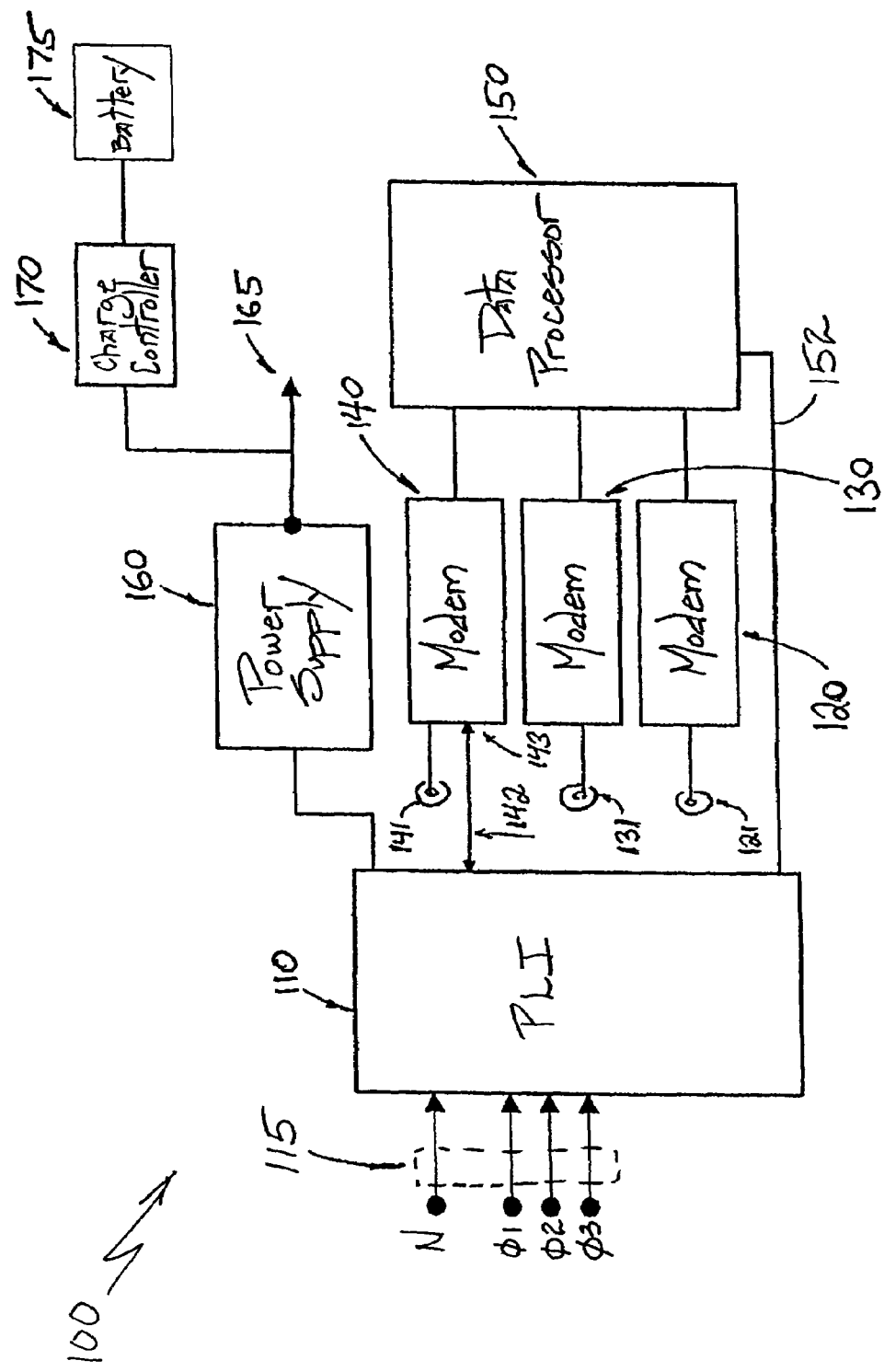
FIG. 1 is a block diagram of a PLC communications node that includes a power line interface.

FIG. 1 is a block diagram of a PLC communications node 100, such as might be installed on a utility pole for overhead lines. Node 100 includes a power line interface (PLI) 110, a power supply 160, a charge controller 170, a battery 175, modems 120, 130 and 140, and a data processor 150. Alternating current (AC) power is provided to node 100 via a power cable 115.

Power cable 115 includes a neutral line (N) and three phase lines, namely phase 1 ($\phi$1), phase 2 ($\Phi$2), and phase 3 ($\Phi$3). Although power cable 115 is shown as having three phase lines, in practice, power cable 115 may include any appropriate quantity of one or more phase lines.

PLI 110 receives AC power from power cable 115, and provides AC power out to power supply 160. PLI 110 is also coupled to modem 140 via a cable 142, and thereby couples data communication signals between power cable 115 and modem 140.

Power supply 160 provides direct current (DC) power to loads (not shown) via lines 165, and also provides power to charge controller 170. Charge controller controls charging of battery 175, which provides power for node 100 in a case where AC power, from power cable 115, fails.

Modems 120, 130 and 140 each has a coupler port 121, 131 and 141 respectively, for connecting modem signals to external inductive or capacitive couplers on low voltage or medium voltage lines. Modem 140 also has a signal port 143, connected to PLI 110 via cable 142, for coupling a signal to power cable 115.

When node 100 is powered by a low voltage power line to which it also needs to couple data, a path is provided via PLI 110, and coupler port 141 is unused. Also, since only one modem, e.g., modem 140, would be for communicating over the low voltage power line that is powering node 100, node 100 may be configured so that modem 140 is that one modem.

Data processor 150 controls modems 120, 130 and 140, by sending commands that configure modems 120, 130 and 140 for a set of operating parameters and sending and receiving digital data to and from a power line via one or more of modems 120, 130 and 140.

A line 152 carries logic data from PLI 110 to data processor 150. The logic data indicates status relating to one or more of the phase lines.

Figure 2:
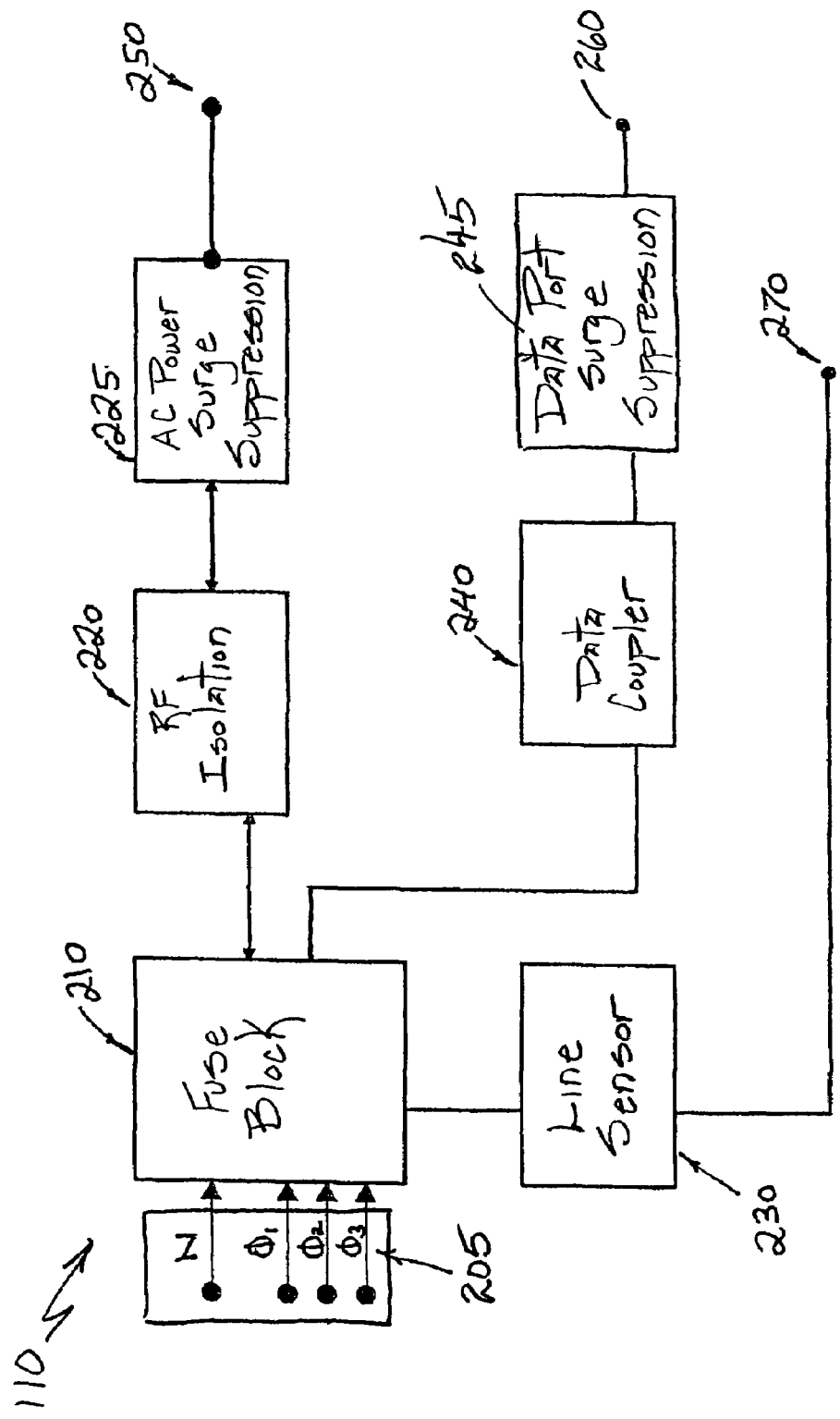
FIG. 2 is a block diagram of a power line interface of FIG. 1.

FIG. 2 is a block diagram of PLI 110. PLI 110 includes an AC power input port 205, a fuse block 210, a radio frequency (RF) isolation circuit 220, an AC power surge suppression circuit 225, a line sensor 230, a capacitive data coupler 240 and a data port surge suppression circuit 245. PLI 110 also includes an AC power output port 250, a data port 260 and a logic port 270.

AC power input port 205 is for connection to power cable 115. AC power output port 250 provides power from power cable 115. AC power surge suppression circuit 225 limits voltage at AC power output port 250. Capacitive data coupler 240 couples a data signal between AC power input port 205 and data port 260. Data port surge suppression circuit 245 limits voltage at data port 260.

AC power input port 205 receives the neutral line (N) and the three phase lines (Φ1, Φ2, Φ3) of power cable 115 (see FIG. 1), and routes these lines to fuse block 210. As explained in greater detail below, in association with FIG. 3, various subsets of the neutral line (N) and the three phase lines (Φ1, Φ2, Φ3) are routed to RF isolation circuit 220, line sensor 230 and capacitive data coupler 240. An output of RF isolation circuit 220 is routed to AC power surge suppression circuit 225. An output of AC power surge suppression circuit 225 is routed to AC power output port 250. An output of line sensor 230 is routed to logic port 270. Capacitive data coupler 240 is coupled to data port surge suppression circuit 245, which is in turn coupled to data port 260.

Figure 3:
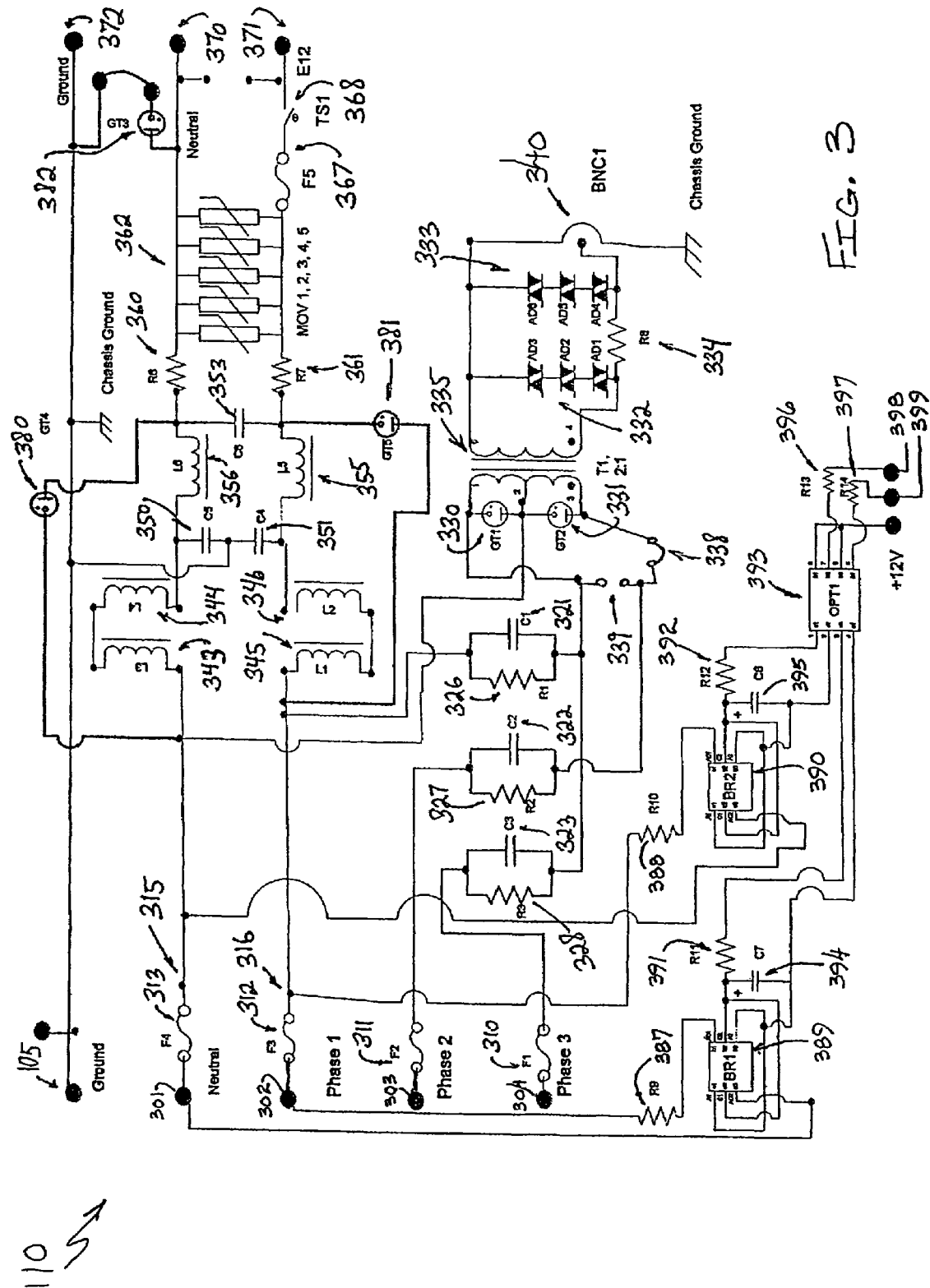
FIG. 3 is a schematic of the power line interface of FIG. 1.

FIG. 3 is a schematic of PLI 110, and provides additional details regarding the implementation of AC power input port 205, fuse block 210, RF isolation circuit 220, AC power surge suppression circuit 225, line sensor 230, capacitive data coupler 240 and data port surge suppression circuit 245.

AC power input port 205 is implemented by terminals 301, 302, 303 and 304, which are connected to the neutral line (N) and the three phase lines (Φ1, Φ2, Φ3) (see FIG. 2) respectively.

A terminal 105 is a safety ground. Terminal 105 is connected to an electrical ground, which may be accessed by connecting to a case, chassis, or other structural component of node 100. For example, terminal 105 may be connected to the chassis of PLI 110 and to the chassis of power supply 160.

Fuse block 210 is connected to AC power input port 205 and is implemented by fuses 310, 311, 312 and 313, in series with the neutral line (N) and the three phase lines (Φ1, Φ2, Φ3), respectively. Fuses 310, 311, 312 and 313 protect PLI 110 from surges on the neutral line (N) and the three phase lines (Φ1, Φ2, Φ3).

RF isolation circuit 220 is implemented by chokes 343, 344, 345, 346, 355 and 356, capacitors 350, 351 and 353, and gas tubes 380 and 381.

AC power surge suppression circuit 225 is implemented by resistors 360 and 361, and five metal oxide varistor (MOV) surge arrestors 362.

Line sensor 230 is implemented by full wave rectifier bridges 389 and 390, a dual optical isolator 393, resistors 387, 391, 388, 392, 396 and 397, and capacitors 394 and 395. An output of line sensor 230 is provided to logic port 270. Logic port 270 is implemented by terminals 398 and 399.

Capacitive data coupler 240 is implemented by resistors 328, 327 and 326, and capacitors 323, 322 and 321.

Data port surge suppression circuit 245 is implemented by gas tubes 330 and 331, a signal transformer 335, avalanche diode strings 332 and 333, and resistor 334.

AC power output port 250 is implemented by terminals 370, 371 and 372. Via AC power output port 250, PLI 110 provides AC power to power supply 160 (see FIG. 1).

Data port 260 is implemented as BNC 340. BNC 340 is connected to modem 140 (see FIG. 1). PLI 110 provides for data communication between modem 140 and power cable 115. The data communication is bi-directional, however, in the following several paragraphs, for sake of simplicity, data communication is described as proceeding from modem 140 to power cable 115.

A data signal from modem is coupled through BNC 340 to a right-side winding of signal transformer 335, and across signal transformer 335. From signal transformer 335, left-side winding, upper terminal, the data signal proceeds (a) through capacitor 321, fuse 312, and terminal 302 to the phase 1 line, and (b) through capacitor 323, fuse 310 and terminal 304 to the phase 3 line. From signal transformer 335, left-side winding, center tap, the data signal proceeds through fuse 313 and terminal 301 to the neutral line. From signal transformer 335, left-side winding lower terminal, the data signal proceeds via a jumper 338, capacitor 322, fuse 311 and terminal 303 to the phase 2 line.

The phase of the data signal appearing at signal transformer 335, left-side winding, bottom terminal is opposite that appearing at signal transformer 335, left-side winding, top terminal. Accordingly, because of the placement of jumper 38, as shown in FIG. 3, the phase of the data signal at the phase 2 line will be opposite that at the phase 1 line and the phase 3 line. Note however that jumper 338 can be removed, and instead, a jumper can be inserted at location 339 so that the data signal from the signal transformer 335, left-side winding, top terminal will also be routed through capacitor 322 to the phase 2 line, and as such, the data signals will be in phase with one another at each of the phase 1, 2 and 3 lines.

When node 100 is installed at a location where less than three phases are available on the low voltage lines of the power distribution system, unused conductors emanating from terminals 303 and 304 may be connected to Phase 1. This arrangement may reduce RF attenuation in the power cable.

Capacitors 321, 322 and 323 must withstand any input surges appearing on AC power input port 205, and must be rated accordingly, for example 6 kV. Capacitors 321, 322 and 323 should have a low impedance and low loss at frequencies in an operating range of 1 to 40 MHz, and may be configured of a ceramic dielectric. Resistors 326, 327 and 328 are connected in parallel with capacitors 321, 322 and 323 respectively, and serve as bleeder resistors to discharge capacitors 321, 322 and 323 for safety, should capacitors 321, 322 and 323 be charged and then disconnected. Resistors 326, 327 and 328 are also be rated for high voltage.

Impulse surges due to lightning or switching transients may arrive at AC power input port 205. Such surges would pass through coupling capacitors 321, 322 and 323 relatively unscathed, but must be prevented from reaching BNC 340. Initial surge protection is provided by avalanche diode strings 332 and 333, which are partially isolated from each other by resistor 334. Connecting avalanche diodes in a series string, as in each of avalanche diode strings 332 and 333, reduces the capacitance of the string relative to a single diode. Typically, capacitance is less than 3 picofarads (pF) for a three-diode string, thus having a negligible capacitive loading effect on PLC signals whose frequencies may reach tens of MHz. The series connection provides a higher combined energy absorption capacity than a similar device of similar capacitance.

Given an occurrence of a surge, after a delay of typically 100 to 200 nanoseconds (ns), gas tubes 330 and/or 331 fire, clamping the surge voltage to less than 50 volts, and removing most of the stress from the relatively low power avalanche diode strings 332 and 333. An effect of this three layered protection scheme, (i.e., gas tubes 330, 331, avalanche diode string 332, and avalanche diode string 333) is to limit the peak voltage on the modem port to less than 60 volts for a period of less than 200 ns.

Chokes 343, 344, 345 and 346 represent a high impedance at RF frequencies, and so, also represent a high impedance at data signal frequencies. They prevent a high frequency signal from BNC 340, that reaches points 315 and 316, from being short circuited by capacitors 350, 351 and 353 and by a capacitance of MOV surge arrestors 362.

In a practical choke, a certain amount of inter-turn capacitance is inherent in its winding, and a parallel resonance of this capacitance with the choke's inductance occurs at a self-resonance frequency. Above this frequency, the choke behaves as a capacitor whose impedance magnitude decreases with frequency. The self-resonant frequency should at least reach the vicinity of the highest-used modem frequency.

One approach to increasing self-resonant frequency is to replace a single choke by a series combination of multiple chokes, each with reduced inductance and stray capacitance compared to a single choke of combined value. This arrangement substantially increases the self-resonant frequency, and is implemented in FIG. 3 by realizing a choke in the neutral line by the pair of series chokes 343 and 344, and similarly in the phase 1 line by chokes 345 and 346. An alternative approach is to use so called pi-wound chokes, which typically have about four sections and are wound in a minimum-capacitance geometry.

Capacitors 350, 351, 353, 355 and 356, and chokes 343, 344, 345 and 346, collectively, operate as a low pass filter. The low pass filter is in series with AC terminals 370 and 371, and the primary purpose of the low pas filter is to block noise generated in power supply 160 (shown in FIG. 1) and applied across terminals 370, 371 and 372, from reaching AC power input port 205 and causing excessive conducted or radiated electromagnetic emissions.

Other circuits inside node 100, such as CPU and modem cards, may generate ambient electromagnetic noise. Such noise, if unabated, may be induced onto wires connected to AC power output port 250, data port 260 and/or logic port 270, and pass through PLI 110, causing excessive conducted or radiated electromagnetic emissions. The aforementioned low pass filter is also for blocking such noise and reducing such emissions.

The above-mentioned electromagnetic noise may also be inducted on conductors inside PLI 110. Therefore, PLI 110 may be packaged inside a shielded box, to minimize such induction and resulting emissions.

When a strong transient pulse arrives on terminal 302, or on terminal 301, chokes 343, 344, 345, 346, 355 and 356 act as open circuits and block the initial portion of the transient pulse. This is particularly important in a case where MOV surge arrestors 362 have a response that is too slow to absorb the initial portion of the transient pulse.

The initial open circuit characteristic of a series arrangement of chokes 343, 344 and 356, and a series arrangement of chokes 345, 346, and 355 causes nearly all of the strong transient pulse to appear across these two series arrangements, and might cause flashover across one or both. To absorb this initial pulse energy safely, gas tubes 380 and 381 are connected across the respective series arrangements of chokes. Each gas tube has a firing voltage in the range of 100 to 300 volts. Gas tube 380 is connected in shunt with the series arrangement of chokes 343, 344 and 356, and gas tube 381 is connected in shunt with the series arrangement of chokes 345, 346 and 355. Gas tube 380 fires when the voltage across the series arrangement of chokes 343, 344 and 356 exceeds its firing voltage, and gas tube 381 fires when the voltage across the series arrangement of chokes 345, 346 and 355 exceeds its firing voltage. The firing of gas tubes 380 and 381 transfers energy of the pulse to the MOV surge arrestors 362. At all other times, gas tubes 380 and 381 act as a low capacitance open circuit, and do not affect the signal isolation function of chokes 343, 344, 345 and 346.

In a typical arrangement, terminal 301 (i.e., neutral) and terminal 105 (i.e., electrical ground) will be connected together at the power lines. If a strong transient pulse is impressed between terminal 302 (i.e., phase 1) and jointly connected terminals 301 and 105, then voltage drops develop across the series arrangement of chokes 343, 344 and 356 and the series arrangement of chokes 345, 346, and 355, but do not develop between terminal 105 and terminal 372, which are connected directly together. Thus, absent some intervening measure, a high common mode voltage will be applied to terminals 370 and 371 with respect to terminal 372, possibly exceeding the common mode input voltage rating of power supply 160. However, under such conditions, gas tube 382 conducts, thus providing the aforementioned intervening measure, and reducing the common mode voltage to safe levels.

Resistors 360 and 361 are low value power resistors, typically 1 ohm and 5 watts each. Resistors 360 and 361 limit the peak surge current that MOV surge arrestors 362 must absorb, increasing the longevity of MOV surge arrestors 362. For a power supply input current of around 1 ampere, the voltage drop of around 2 volts for resistors 360 and 361 would not affect operation of power supply 160.

Fuse 313 (i.e., neutral) and fuse 312 (i.e., phase 1) have a current rating designed to blow upon the arrival of a transient surge pulse of an amplitude that would damage PLI 110. The current rating for fuses 312 and 313 is higher than that suitable for protecting power supply 160. Therefore, an additional fuse 367 is placed downstream of AC power surge suppression circuit 225, in series with terminal 371. A thermal cutout 368 protects node 100 from overheating, and cuts off power to power supply 160, should the temperature inside the casing of node 100 exceed a preset value.

Line sensor 230 is a dual line voltage sensor. Resistor 387 is connected to terminal 302, and resistor 388 is connected to the downstream side of fuse 312, i.e., point 316, to sense whether phase voltage is present on terminal 302 and whether fuse 312 is blown. Resistor 387 and 388 are high value, typically 120 k ohms, rated for at least 6 kV so as to survive input transient surges on terminals 301 and 302. Resistor 387 and 388 conduct a small amount of line current to full wave rectifier bridges 389 and 390. Full wave rectifier bridges 389 converts the voltage sensed by resistor 387 and provide a DC output. Full wave rectifier bridges 390 converts the voltage sensed by resistor 388 and provide a DC output. The DC outputs of full wave rectifier bridges 389 and 390 are routed, via current limiting resistors 391 and 392, to light emitting diodes (LEDs) in dual optical isolator 393. Capacitors 394 and 395 minimize ripple, and keep the LEDs conducting over the entire power frequency cycle, when terminal 302 and point 316 are energized. Dual optical isolator 393 provides isolated signals, via resistors 396 and 397, to terminals 398 and 399. Resistors 396 and 397 limit output currents in case of short circuit faults on terminals 398 and 399. Outputs from terminals 398 and 399 are provided to logic input circuits (not shown) of data processor 150 (see FIG. 1).

Figure 4:
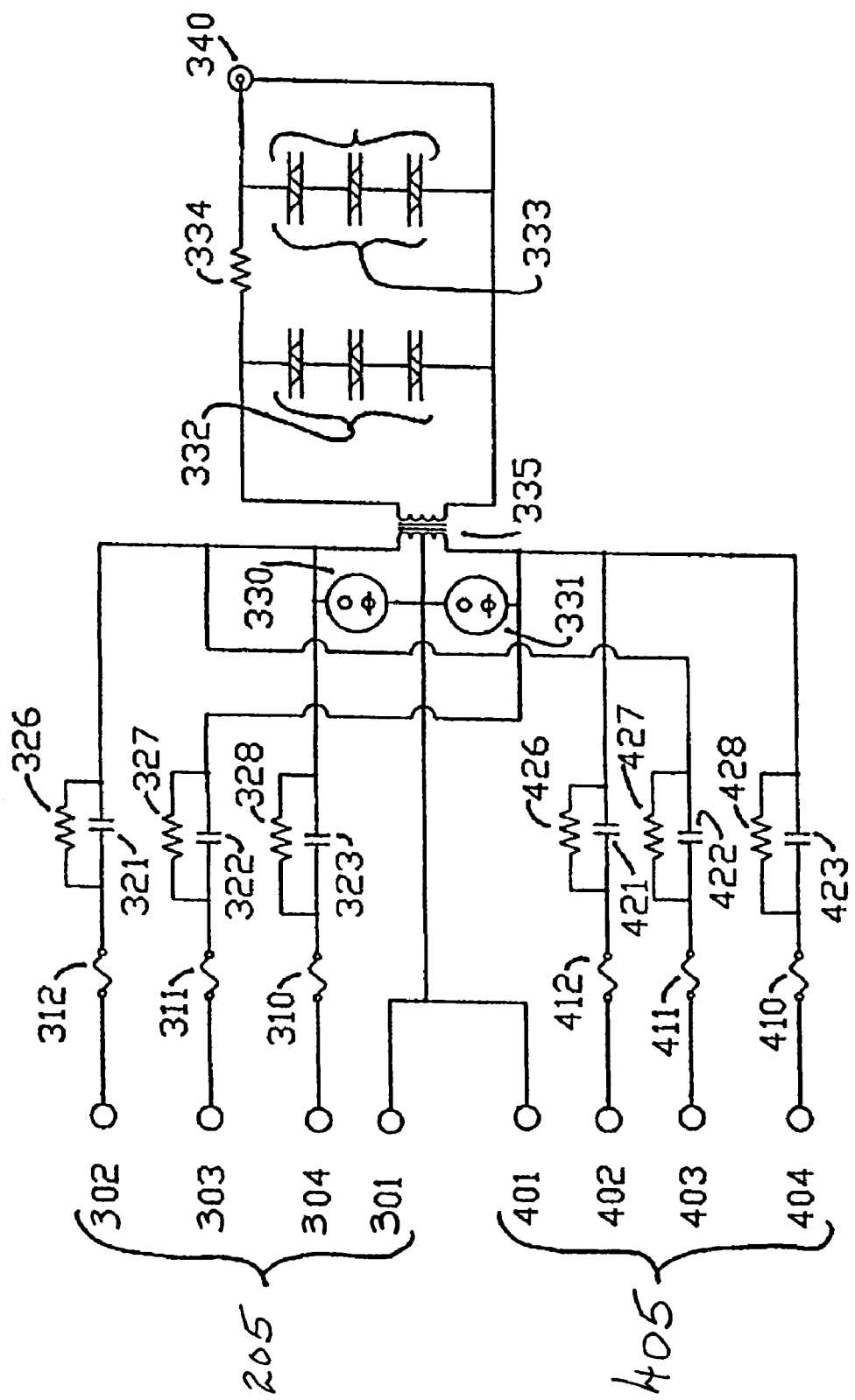
FIG. 4 is a schematic of a power line interface for coupling signals to two AC power lines, each of which includes a plurality of phase lines.

FIG. 4 is a conceptual subset of the implementation of FIG. 3, and shows an alternative arrangement that relates to capacitive coupling where no AC power flow is required. FIG. 4 introduces coupling capacitors 421, 422 and 423 and their corresponding bleeder resistors 426, 427 and 428 to connect to an AC power input port 405. AC power input port 405 is separately fused by fuses 410, 411 and 412, which protect against overcurrent should a coupling capacitor 421, 422 or 423 fail by short circuiting. As explained above, AC power input port 205 connect to power cable 115. AC power input port 405 connects to an additional power line having up to three phases.

The techniques described herein are exemplary, and should not be construed as implying any particular limitation on the present invention. It should be understood that various alternatives, combinations and modifications could be devised by those skilled in the art. The present invention is intended to embrace all such alternatives, modifications and variances that fall within the scope of the appended claims.

What is claimed is:

1. A system comprising:
   an AC power input port for connection to an AC power line;
   an AC power output port for providing power from said AC power line;
   an AC power surge suppression circuit for limiting voltage at said AC power output port;
   a data port;
   a capacitive data coupler for coupling a data signal between said AC power input port and said data port; and
   a data port surge suppression circuit for limiting voltage at said data port.

2. The system of claim 1,
   wherein said AC power line includes a plurality of power phase lines, and
   wherein said AC power input port is for connection to said plurality of power phase lines.

3. The system of claim 2, wherein said capacitive data coupler couples data signals between said data port and more than one of said plurality of power phase lines.

4. The system of claim 3,
   wherein said capacitive data coupler couples a first data signal having a first phase to a first of said plurality of power phase lines, and
   wherein said capacitive data coupler couples a second data signal having a second phase to a second of said plurality of power phase lines.

5. The system of claim 1, further comprising an inductive choke that isolates said AC power surge suppression circuit from said AC power input port, wherein said inductive choke has high impedance at a frequency of said data signal.

6. The system of claim 5, wherein said inductive choke comprises a plurality of chokes in series with said AC power input port.

7. The system of claim 5, further comprising:
   a fuse for protecting said AC power output port,
   wherein said AC power surge suppression circuit comprises a low capacitance surge arrestor having (a) a first terminal connected to a terminal of said inductive choke closest to said AC power input port, and (b) a second terminal connected to a terminal of said inductive choke closest to said AC power output port.

8. The system of claim 5, wherein said AC power surge suppression circuit comprises a surge arrestor connected in shunt across said inductive choke.

9. The system of claim 8, wherein said surge arrestor comprises a gas tube arrestor.

10. The system of claim 1, further comprising a low pass filter in series with said AC power output port.

11. The system of claim 1, wherein said AC power surge suppression circuit comprises a surge arrestor connected between said AC power output port and an electrical ground.

12. The system of claim 1, where said data port surge suppression circuit comprises a gas tube arrestor and an avalanche diode arrestor.

13. The system of claim 1, further comprising:
   a resistor that senses a voltage from said AC power input port;
   a converter that converts said sensed voltage to a DC voltage, and
   an optical isolator that receives said DC voltage, and provides an isolated signal to a logic output port.

14. The system of claim 1, further comprising:
   a first fuse having a first current rating, in series with said AC power input port; and
   a second fuse having a second current rating, in series with said AC power output port,
   wherein said first and second current ratings are different from one another.

15. The system of claim 1,
   wherein said AC power input port is a first AC power port, and said AC power line is a first AC power line, and
   wherein said system further comprises a second AC power input port for connection to a second AC power line.

16. The system of claim 15,
   wherein said second AC power line includes a plurality of power phase lines, and
   wherein said second AC power input port is for connection to said plurality of power phase lines.

* * * * *